United States Patent
Sato

(10) Patent No.: US 8,737,615 B2
(45) Date of Patent: May 27, 2014

(54) CONTENT TRANSMISSION SYSTEM, COMMUNICATION DEVICE, AND CONTENT TRANSMISSION METHOD

(75) Inventor: Masahiko Sato, Tokyo (JP)

(73) Assignee: Sony Corporation (JP)

( * ) Notice: Subject to any disclaimer, the term of this patent is extended or adjusted under 35 U.S.C. 154(b) by 956 days.

(21) Appl. No.: 12/386,027

(22) Filed: Apr. 13, 2009

(65) Prior Publication Data

US 2009/0257592 A1 Oct. 15, 2009

(30) Foreign Application Priority Data

Apr. 15, 2008 (JP) ................................ P2008-105978

(51) Int. Cl.
*H04K 1/00* (2006.01)
*H04L 9/00* (2006.01)

(52) U.S. Cl.
USPC .............................. 380/255; 380/270; 380/44

(58) Field of Classification Search
USPC .......................................... 380/255, 44, 277
See application file for complete search history.

(56) References Cited

U.S. PATENT DOCUMENTS

| | | | |
|---|---|---|---|
| 7,353,391 B2 | 4/2008 | Sato et al. | |
| 2003/0226011 A1* | 12/2003 | Kuwano et al. | 713/155 |
| 2004/0268131 A1* | 12/2004 | Kudo et al. | 713/182 |
| 2006/0045271 A1* | 3/2006 | Helbig et al. | 380/270 |
| 2006/0083378 A1 | 4/2006 | Budde et al. | |
| 2006/0265735 A1* | 11/2006 | Ohno | 726/2 |
| 2008/0267404 A1 | 10/2008 | Budde et al. | |

FOREIGN PATENT DOCUMENTS

| | | | |
|---|---|---|---|
| EP | 1024626 | * | 8/2000 |
| JP | 2002171205 A | | 6/2002 |
| JP | 2002198957 A | | 7/2002 |
| JP | 3669293 B2 | | 7/2005 |
| JP | 2005535197 T | | 11/2005 |
| JP | 2005535199 T | | 11/2005 |
| JP | 2005536093 T | | 11/2005 |

OTHER PUBLICATIONS

Office Action from Japanese Application No. 2008-105978, dated Mar. 16, 2010.

* cited by examiner

*Primary Examiner* — Brandon Hoffman
*Assistant Examiner* — Samuel Ambaye
(74) *Attorney, Agent, or Firm* — Lerner, David, Littenberg, Krumholz & Mentlik, LLP

(57) ABSTRACT

A content transmission system includes: a content transmission device that includes an encryption portion that encrypts content data using key information, a first communication portion that transmits, using a first communication method, content data encrypted by the encryption portion, and a second communication portion that performs communication using a second communication method that differs from the first communication method; a content reception device that includes a third communication portion that receives encrypted content data transmitted from the first communication portion using the first communication method, a decoding portion that decodes encrypted content data received by the third communication portion using key information that is symmetric or asymmetric to the key information, and a fourth communication portion that performs communication using the second communication method; and a communication device that acquires the key information and transmits the acquired key information using the second communication method.

9 Claims, 9 Drawing Sheets

CONTENT TRANSMISSION SYSTEM, COMMUNICATION DEVICE, AND CONTENT TRANSMISSION METHOD

The present application claims priority from Japanese Patent Application No. JP 2008-105978, filed in the Japanese Patent Office on Apr. 15, 2008, the entire content of which is incorporated herein by reference.

BACKGROUND OF THE INVENTION

1. Field of the Invention

The present invention relates to a content transmission system, a communication device and a content transmission method.

2. Description of the Related Art

Recently, a home network has been proposed in which, by establishing an internet protocol (IP) connection respectively for image processing devices within a household, content data can be shared between a plurality of image processing devices. In the proposed home network, a technology to ensure copyright protection is digital transmission content protection (DTCP).

DTCP applies round-trip time (RTT) technology and, by setting a tolerance value for the round-trip time (RTT time) between two devices included in the home network, restricts the distance between the two devices at which they can transmit and receive content data. However, in actuality, a response time includes a variety of delays due to network conditions, and if the response time tolerance value is too low, the communication between the two household devices may be restricted. On the other hand, if the response time tolerance value is increased, content data is acquired from the home network by a device that exists externally to the home network, and it is thus difficult to meet the objectives of copyright protection. For example, with DTCP, if the response time tolerance value is restricted to 7 ms, taking into account the delays of a wireless router or the like, in theory, the maximum range of access is 1050 km at the speed of light.

Also, a wireless communication device is disclosed in Japanese Patent No. 3669293 that performs data communication after mutual authentication. More specifically, the above wireless communication device performs mutual authentication by reducing the transmission power of the wireless signal in comparison to that at the time of data communication. With this set up, as the distance between the wireless communication device and the authentication device is restricted, the number of devices that are able to transmit and receive content data with the wireless communication device is also restricted.

SUMMARY OF THE INVENTION

However, if there is no device for authentication within the range for possible authentication with a known wireless communication device, it is necessary, for example, for a user to move at least one wireless communication device. In a home network, if the above-described wireless communication device is, for example, a display or an image processing device or the like, it is complicated for the user to move the display or image processing device.

To address this, the present invention provides a new and improved content transmission system, communication device and content transmission method that allow key information to be shared more easily between a plurality of devices.

According to an embodiment of the present invention, there is provided a content transmission system that includes a content transmission device, a content reception device and a communication device. More specifically, the content transmission device includes: an encryption portion that encrypts content data using key information; a first communication portion that transmits, using a first communication method, content data encrypted by the encryption portion; and a second communication portion that performs communication using a second communication method that differs from the first communication method. Further, the content reception device includes: a third communication portion that receives encrypted content data transmitted from the first communication portion using the first communication method; a decoding portion that decodes encrypted content data received by the third communication portion, using key information that is symmetric or asymmetric to the key information; and a fourth communication portion that performs communication using the second communication method. Further, the communication device acquires the key information and transmits the acquired key information using the second communication method.

With this configuration, even if the distance between the content transmission device and the content reception device is outside the range of access using the second communication method, one of the content transmission device and the content reception device can acquire key information via a communication device that operates using the second communication method. As a result, the user does not need to move the content transmission device and the content reception device into close proximity with each other, and by sharing one of symmetric and asymmetric key information between the content transmission device and the content reception device, content data can be shared between the content transmission device and the content reception device.

The communication device may further include a key generation portion that acquires the key information by generating the key information, and may transmit the key information generated by the key generation portion to the second communication portion and to the fourth communication portion.

The communication device may further include: a fifth communication portion that receives the key information using the second communication method from one of the content transmission device and the content reception device; and a memory portion that records the key information received by the fifth communication portion. Moreover, the fifth communication portion may transmit the key information recorded in the memory portion to the other one of the content transmission device and the content reception device using the second communication method.

Further, the communication device may further include a control portion that restricts to a predetermined period of time the period of time in which it is possible to transmit the key information to the other one of the content transmission device and the transmission reception device from the point in time at which the fifth communication portion receives the key information from one of the content transmission device and the content reception device.

According to another embodiment of the present invention, there is provided a communication device that includes a fifth communication portion that is capable of communicating with a content transmission device and a content reception device using a second communication method. The content transmission device includes: an encryption portion that encrypts content data using key information; a first communication portion that transmits, using a first communication method, content data encrypted by the encryption portion; and a second communication portion that performs communication using the second communication method that differs from the first communication method. Further, the content reception device includes: a third communication portion that receives encrypted content data transmitted from the first communication portion using the first communication method; a decoding portion that decodes encrypted content data received by the third communication portion using key information that is symmetric or asymmetric to the key information; and a fourth communication portion that performs communication using the second communication method. The communication device further includes a key generation portion that generates the key information, and the fifth communication portion transmits the key information generated by the key generation portion to the second communication portion and the fourth communication portion.

With this configuration, the content transmission device acquires key information from the communication device via the second communication portion, and the content reception device acquires key information from the communication device via the fourth communication portion, thus allowing the content transmission device and the content reception device to share one of symmetric and asymmetric key information. Further, even if the distance between the content transmission device and the content reception device is outside the range of access of the second communication method, the user can share key information between the content transmission device and the content reception device by moving the communication device.

According to another embodiment of the present invention, there is provided a content transmission method including the steps of: transmitting, by a content transmission device that is compliant with a first transmission method and a second transmission method that differs from the first transmission method, encrypted content data using the first transmission method, the content data being encrypted by the content transmission device using key information; receiving and decoding, by a content reception device that is compliant with the first communication method and the second communication method, encrypted content data, the content data being decoded by the content reception device using key information that is symmetric or asymmetric to the key information. Before the step of transmitting, a communication device acquires the key information and transmits the acquired key information, using the second communication method, to at least one of the content transmission device and the content reception device.

According to the embodiments of the present invention described above, the devices that are allowed to share content data can be more easily restricted.

DETAILED DESCRIPTION OF THE PREFERRED EMBODIMENTS

Figure 1:
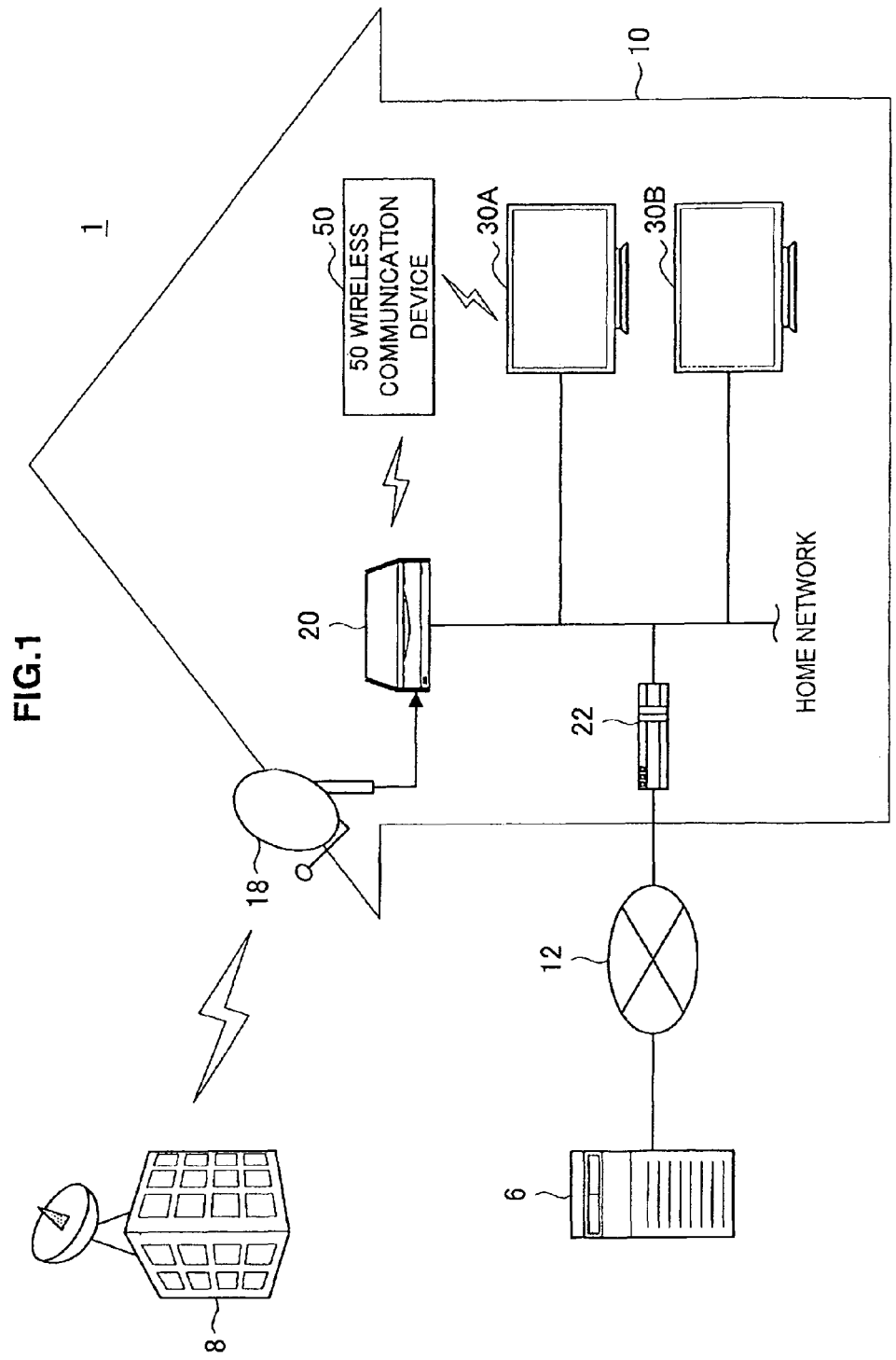
FIG. 1 is an explanatory diagram showing a configuration of a content transmission system according to the present embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Here, the "Detailed Description of the Preferred Embodiments" is explained in the following order.

(1) Outline of content transmission system according to the present embodiment.
(2) DMS hardware configuration
(3) DMS functions
(4) DMP functions
(5) Wireless communication device functions
(6) Operations of content transmission system according to the present embodiment
(7) Modified example
(8) Conclusion (1) Outline of Content Transmission System According to the Present Embodiment First, an outline explanation of a content transmission system according to the present embodiment will be made with reference to FIG. 1.

FIG. 1 is an explanatory diagram showing a configuration of a content transmission system 1 according to the present embodiment. As shown in FIG. 1, the content transmission system 1 includes a content server 6, a broadcast station 8, a communication network 12 and a home network 10.

The content server 6 is connected to the home network 10 via the communication network 12, and transmits content data and metadata to the home network 10. For example, when the content server 6 receives a request from the home network 10 for a content list, the content server 6 transmits metadata for stored content data to the home network 10. Further, when the content server 6 receives a request from the home network 10 for specific content data, it transmits stored specific content data to the home network 10. The content server 6 may be an IPTV server that is part of an Internet Protocol (IP) TV service.

Note that the content data stored in the content server 6 may include music data, such as music, lectures and radio programs etc., image data, such as movies, television programs, video programs, photographs, documents, pictures and diagrams etc., and other data, such as games and software etc.

The broadcast station 8 broadcasts content data using an arbitrary method. In other words, although in the example in FIG. 1, the broadcast station 8 wirelessly broadcasts the content data, the broadcast station 8 may broadcast the content data using a wired system. For example, the broadcast station 8 may perform any arbitrary broadcast, such as digital terrestrial broadcasting, cable television broadcasting, broadcasting satellite (BS) digital broadcasting, communication satellite (CS) digital broadcasting and the like.

The communication network 12 is a wired or wireless transmission path for information that is transmitted from the devices connected to the communication network 12. For example, the communication network 12 may include a public network, such as the Internet, a telephone network or a satellite communication network, and a leased line network of any kind that uses Ethernet (registered trademark), such as a local area network (LAN), a wide area network (WAN), or an Internet Protocol-Virtual Private Network (IP-VPN).

The home network 10 includes an antenna 18, a digital media server (DMS) 20, a router 22, digital media players (DMP) 30A and 30B, and a wireless communication device 50. In FIG. 1, in order to distinguish each DMP, a capital letter alphabetic character is added, such as the DMP 30A and the DMP 30B. However, where it is not particularly necessary to make a distinction, the generic term used will simply be the DMP 30.

The antenna 18 receives the broadcast waves of the content data transmitted from the broadcast station 8 and feeds the received content data to the DMS 20. The router 22 is connected to the content server 6 via the communication network 12, and relays requests from the DMS 20 and data transmitted from the content server 6.

The DMS 20 (source device) stores the content data and metadata fed via the antenna 18 and the router 22. Further, the DMS 20 functions as a content transmission device that transmits the stored content data to the DMP 30 in response to a request from the DMP 30. Note that, as explained in detail in the section "(3) DMS functions," the DMS 20 according to the present embodiment uses a predetermined encryption key to encrypt the content data and transmits the encrypted content data to the DMP 30.

The DMP 30 (sink device) functions as a data reception device that requests and receives the content list and the content data from the DMS 20. Further, the DMP 30 functions as a playback device that plays back the content data acquired from the DMS 20. Here, the DMP 30 can use the predetermined encryption key to decode the content data.

Note that in FIG. 1, the DMS 20 and the DMP 30 are shown separately, but the DMS 20 and the DMP 30 may be provided as a single unit. Further, the example in FIG. 1 shows the DMS 20 that incorporates the function of a receiver, but the DMS 20 and a receiver may be separately provided. Moreover, a receiver and the DMP 30 may be provided as a single unit, or may be provided separately. Further, the DMS 20 and the DMP 30 may conform to digital living network alliance (DLNA) guidelines.

Further, the example of the DMP 30 shown in FIG. 1 is a monitor, but the DMP 30 may be an information processing device, such as a personal computer (PC), a household image processing device (a DVD recorder, a video deck and the like), a mobile phone, a personal handyphone system (PHS), a portable music playback device, a portable image processing device, a personal digital assistant (PDA), a household game console, a mobile game console, a household electrical appliance and the like. The detailed functions of the DMP 30 will be described later in "(4) DMP functions". Similarly, the DMS 20 may be any information processing device described above.

Above, an outline explanation is given of the content transmission system 1 that includes the home network 10 according to the present embodiment, with reference to FIG. 1. Next, a flow of communication that is performed between the DMS 20 and the DMP 30 will be explained with reference to FIG. 2.

Figure 2:
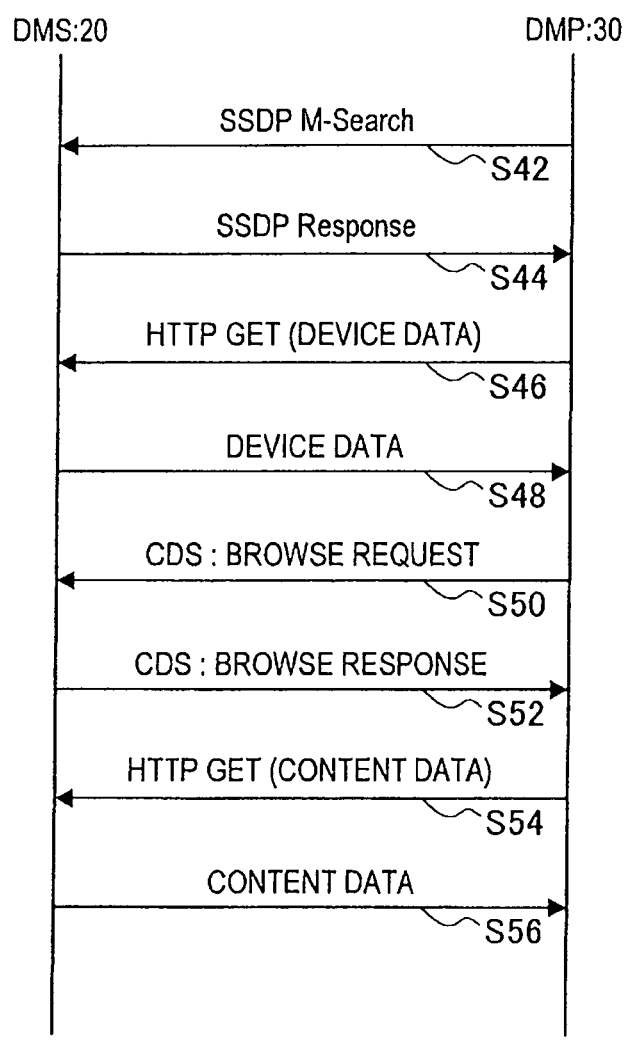
FIG. 2 is a sequence diagram showing a flow of communication performed between a DMS and a DMP.

FIG. 2 is a sequence diagram that shows the flow of communication that is performed between the DMS 20 and the DMP 30. First, the DMP 30 searches for the DMS 20 that exists within the home network 10. More specifically, as shown in FIG. 2, the DMP 30 transmits a simple service discovery protocol (SSDP) M-search within the home network 10, in accordance with the UPnP standard (step S42).

Then, when the DMS 20 receives the SSDP M-search from the DMP 30, the DMS 20 transmits an SSDP response to the DMP 30 in accordance with the UPnP standard, as shown in FIG. 2 (step S44). By receiving the SSDP response, the DMP 30 can ascertain the existence of the DMS 20 and identify the DMS 20 IP address and the like.

Following that, the DMP 30 requests the DMS 20 to transmit device data relating to the DMS 20 device. More specifically, as shown in FIG. 2, the DMP 30 transmits a hyper text transfer protocol (HTTP) GET (device data) to the DMS 20 (step S46).

Then, as shown in FIG. 2, when the DMS 20 receives the HTTP GET (device description) from the DMP 30, the DMS 20 transmits the device data (description) to the DMP 30 (step S48). Note that the device data can include selected attribute information relating to the DMS 20, such as the DMS 20 manufacturer name, device name, device ID, on-board functions etc.

Next, the DMP 30 requests the DMS 20 to transmit a list of the content data stored in the DMS 20 or part of the list of the content data stored in the DMS 20. In concrete terms, as shown in FIG. 2, the DMP 30 transmits a content directory service (CDS): Browse request to the DMS 20 (step S50).

Then, when the DMS 20 receives the CDS: Browse request from the DMP 30, the DMS 20 transmits the content list relating to the CDS: Browse request to the DMP 30. More specifically, as shown in FIG. 2, the DMS 20 transmits a CDS: Browse response to the DMP 30 (step S52). Note that the content list may be metadata of a plurality of content data.

In addition, the DMP 30 requests the DMS 20 for content data selected by a user from the content list acquired at step S52. More specifically, as shown in FIG. 2, the DMP 30 transmits an HTTP GET (content data) to the DMS 20 (step S54). When the DMS 20 receives the HTTP GET (content data) from the DMP 30, it searches the content data relating to the HTTP GET (content data) from among the content data stored in the DMS 20, encodes the content data and transmits it to the DMP 30 (step S56). Through the above-described flow, the DMP 30 is able to acquire the content data from the DMS 20 and play it back.

Background of the Present Embodiment

As explained above, in order for the DMS 20 and the DMP 30 to encode and decode the content data, it is necessary for them to share an encryption key in advance. To achieve the sharing of an encryption key, a DMS and a DMP relating to the present embodiment execute a method described as follows.

For example, the DMS relating to the present embodiment generates an encryption key and wirelessly transmits the generated encryption key to the DMP. Here, so that the encryption key is not intercepted by an inappropriate device, when the DMS relating to the present embodiment transmits the encryption key, it restricts the range of access of the wireless signal to, for example, 1 meter or less.

Therefore, in order for the DMS and the DMP relating to the present embodiment to share the encryption key, it was necessary for the DMS and the DMP relating to the present embodiment to be in close proximity to each other. However, as the DMS and the DMP relating to the present embodiment are, for example, a display or an image processing device and the like, it is complicated for a user to move the DMS and the DMP relating to the present embodiment.

In light of the above-described circumstances, the content transmission system 1 according to the present embodiment has been created. With the content transmission system 1 according to the present embodiment, it becomes possible to more easily restrict the devices that are allowed to share content data. The DMS 20, the DMP 30 and the wireless communication device 50 that form part of this type of the content transmission system 1 are explained below.

(2) DMS Hardware Configuration

Figure 3:
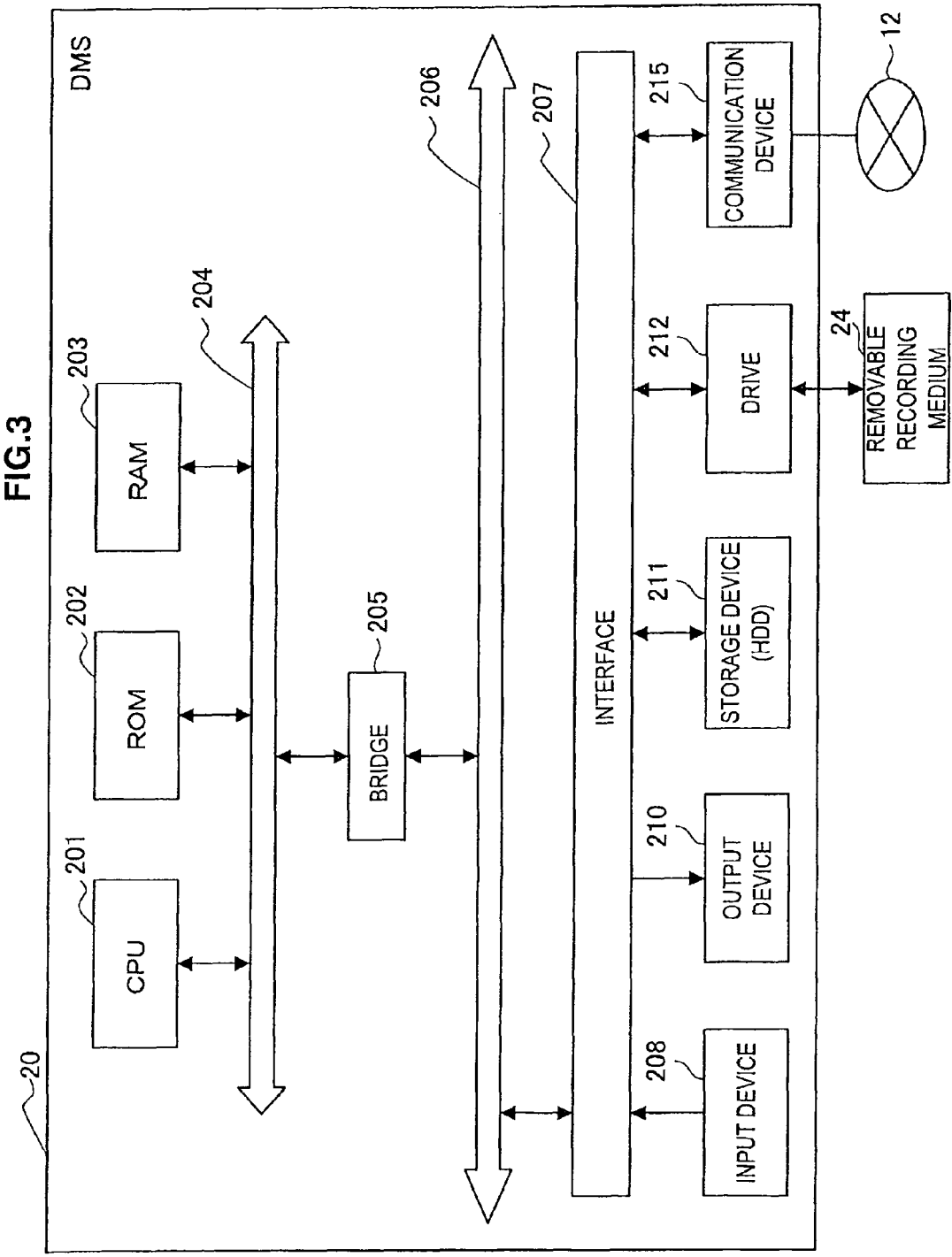
FIG. 3 is an explanatory diagram showing a DMS hardware configuration according to the present embodiment.

FIG. 3 is an explanatory diagram showing a configuration of the DMS 20 according to the present embodiment. The DMS 20 includes a central processing unit (CPU) 201, a read only memory (ROM) 202, a random access memory (RAM) 203, a host bus 204, a bridge 205, an external bus 206, an interface 207, an input device 208, an output device 210, a storage device (HDD) 211, a drive 212 and a communication device 215.

The CPU 201 functions as an arithmetic processing device and a control device and controls the overall operations within the DMS 20 in accordance with a variety of programs. The CPU 201 may be a microprocessor. The ROM 202 stores programs and computing parameters used by the CPU 201. The RAM 203 is primary storage for programs used in execution of the CPU 201 and for parameters etc. that vary in accordance with the execution of the CPU 201. These are mutually connected by the host bus 204 that is formed of a CPU bus and the like.

The host bus 204 is connected to the external bus 206, such as a peripheral component interconnect/interface (PCI) bus, via the bridge 205. Note that the host bus 204 need not necessarily be established separately to the bridge 205 and the external bus 206, and a single bus may be equipped with these functions.

The input device 208 includes an input device for a user to input information, such as, for example, a mouse, a keyboard, a touch panel, a button, a microphone, a switch and a lever. The input device 208 also includes an input control circuit etc. that generates an input signal based on input by the user and outputs the signal to the CPU 201. By operating the input device 208, the user of the DMS 20 can input a variety of data into the DMS 20 and instruct processing operations etc.

The output device 210 includes a display device, such as, for example, a cathode ray tube (CRT) display device, a liquid crystal display (LCD) device, an organic light emitting display (OLED) device and a lamp, and an audio output device, such as speakers and headphones etc. The output device 210 outputs, for example, content to be played back. More specifically, the display device displays the played back variety of information, such as image data etc. as text or as images. Meanwhile, the audio output device converts the played back audio data etc. to audio and outputs it.

The storage device 211 is a device for storing data that is an example of the storage portion of the DMS 20 according to the present embodiment. The storage device 211 may include a storage medium, a recording device that records data onto the storage medium, a readout device that reads the data from the storage medium, a deletion device that deletes the data recorded on the storage medium and so on. The storage device 211 is, for example, a hard disk drive (HDD). The storage device 211 drives a hard disk and stores programs executed by the CPU 201 and a variety of data. Content data, metadata and device data etc. are also recorded in the storage device 211.

The drive 212 is a reader/writer for a storage medium and is integrated into the DMS 20 or provided externally. The drive 212 reads information recorded into an installed removable storage medium 24, such as a magnetic disk, an optical disk, a magneto-optical disk, or a semiconductor memory and the like and outputs the information to the RAM 203.

The communication device 215 is, for example, a communication interface that is formed of a communication device etc. to connect to the communication network 12. Further, the communication device 215 may be a communication device that is compatible with a wireless local area network (LAN), a communication device that is compatible with a wireless USB, or a wired communication device that performs communication by a wired connection. The communication device 215 receives and transmits a variety of data, such as content data, metadata and so on with the content server 6 via the communication network 12.

Note that while the DMS 20 hardware configuration is explained above with reference to FIG. 3, as the DMP 30 hardware and the wireless communication device 50 hardware have substantially the same configuration as the DMS 20, an explanation is omitted here.

(3) DMS Functions

The hardware configuration of the DMS 20 according to the present embodiment is explained above with reference to FIG. 3. Next, the functions of the DMS 20 according to the present embodiment will be explained with reference to FIG. 4.

Figure 4:
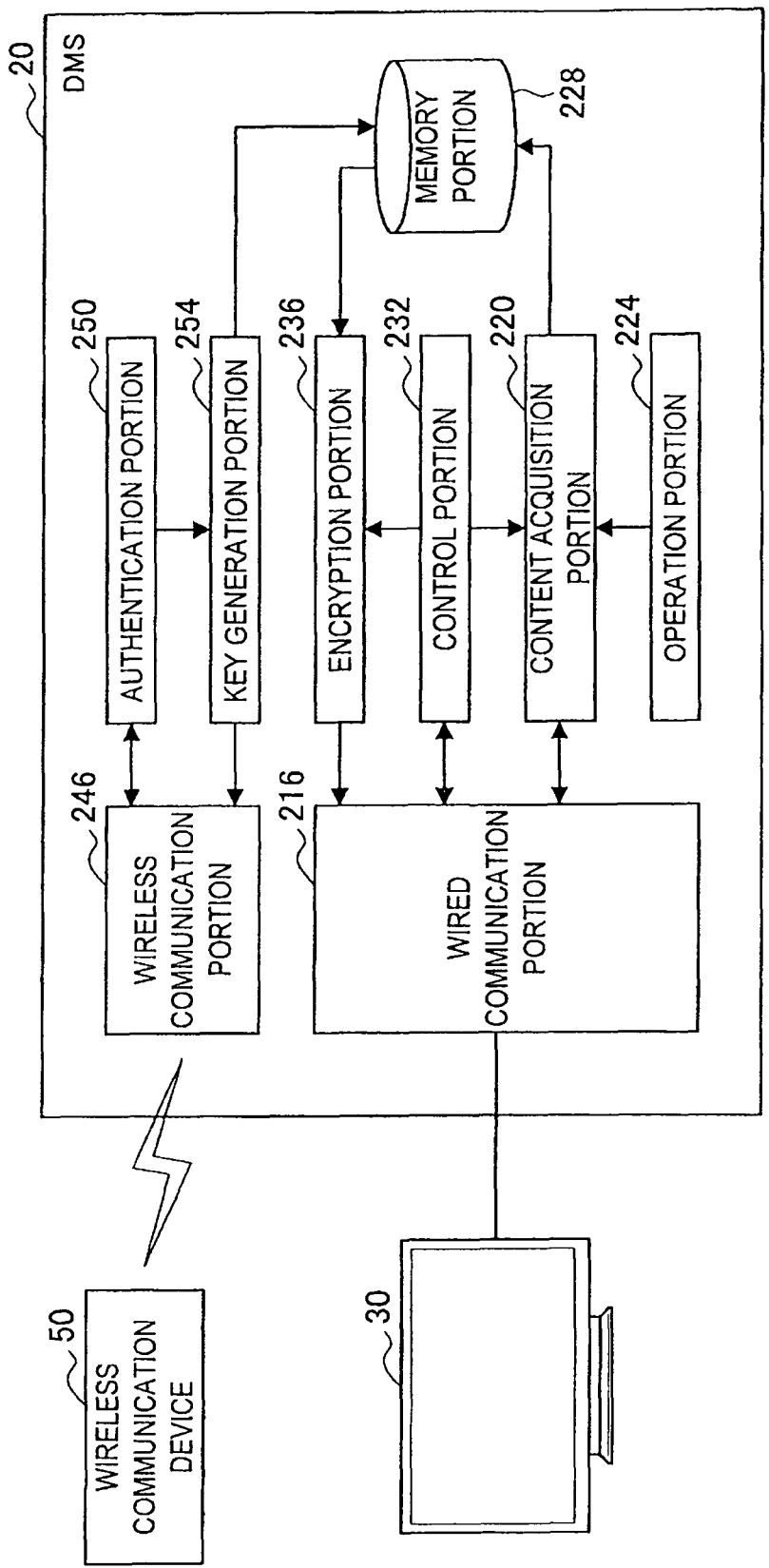
FIG. 4 is a functional block diagram showing a configuration of the DMS according to the present embodiment.

FIG. 4 is a functional block diagram that shows a configuration of the DMS 20 according to the present embodiment. As shown in FIG. 4, the DMS 20 according to the present embodiment includes a wired communication portion 216, a content acquisition portion 220, an operation portion 224, a memory portion 228, a control portion 232, an encryption portion 236, a wireless communication portion 246, an authentication portion 250, and a key generation portion 254.

The wired communication portion 216 is an interface with other devices included in the home network 10 and external devices and functions as a receiving portion that receives a variety of data from the other devices and as a first communication portion that transmits a variety of data to the other devices. For example, the wired communication portion 216 receives content data from the content server 6, and transmits content data to the DMP 30. Further, the wired communication portion 216 may have communication functions that are compatible with IEEE802.3 compliant wired LAN, or communication functions that are high-definition multimedia interface (HDMI)-compatible. Moreover, the wired communication portion 216 may have internet protocol (IP) communication functions that operate via the Ethernet (registered trademark). Note that in FIG. 4, wired communication is shown as an example of a first communication method by the first communication portion, but the first communication method may alternatively be an arbitrary communication method that differs from wireless communication by the wireless communication portion 246 that is shown as an example of a second communication portion.

Based on user operation of the operation portion 224, the content acquisition portion 220 requests the content server 6 to transmit content data, acquires the content data transmitted from the content server 6 and records the content data to the memory portion 228.

The operation portion 224 is an interface with the user of the DMS 20. The operation portion 224 includes an operation device having a photoreceptor portion for an infrared signal or a receptor portion for a wireless signal generated by a touch panel, button, switch, lever, dial or remote control. The operation portion 224 also includes an input control circuit etc. that generates an operation signal in accordance with operation by the user of the operation device and outputs the operation signal. By operating the operation portion 224, the user of the DMS 20 can input a variety of data into the DMS 20 and instruct a variety of processes. For example, the user can use the operation portion 224 to instruct acquisition of content data from the content server 6.

The memory portion 228 is a storage medium that records a variety of data, such as content data and the encryption key and so on. This type of the memory portion 228 may be, for example, a non-volatile memory such as an electronically erasable programmable read-only memory (EEPROM), an erasable programmable read-only memory (EPROM), or the like, a magnetic disk such as a hard disk, a magnetic material disc or the like, an optical disk such as a compact disc recordable (CD-R), a compact disc rewritable (CD-RW), a digital versatile disc recordable (DVD-R), a digital versatile disc rewritable (DVD-RW), a dual-layer digital versatile disc recordable (DVD+R), a dual-layer digital versatile disc rewritable (DVD+RW), a digital versatile disc random access memory (DVD-RAM), a Blu-ray™ disc recordable (BD-R), a Blu-ray™ disc rewritable (BD-RE), or the like, or a magneto-optical (MO) disk.

When the control portion 232 receives a request from the DMP 30 to transmit content data, it causes the encryption portion 236 to encrypt the content data, and transmits the encrypted content data to the DMP 30 via the wired communication portion 216.

The encryption portion 236 uses the encryption key recorded in the memory portion 228 to encrypt the content data requested by the DMP 30. The encryption key recorded in the memory portion 228 is an encryption key generated by the key generation portion 254 described later.

The wireless communication portion 246 is an interface with the wireless communication device 50, and functions as the second communication portion that performs communication using a second communication method that differs from the communication method used by the wired communication portion 216. The wireless communication portion 246 may have, for example, wireless communication functions that comply with the Institute of Electrical and Electronic Engineers (IEEE) 802.11a, b, and g etc. standards, or may have multiple input multiple output (MIMO) compliant communication functions as prescribed by the IEEE802.11n standards. Note that although, in the above description, the example of the second communication method is wireless communication, the second communication method may alternatively be wired communication, noncontact communication or optical communication. Note also that the wireless communication portion 246 can restrict the range of access of the wireless signal by changing the transmission power.

The authentication portion 250 performs an authentication process with the wireless communication device 50 via the wireless communication portion 246. Further, the key generation portion 254 generates, for example, random numbers as the encryption key (key information) and records the key in the memory portion 228. Moreover, after the authentication process with the wireless communication device 50 by the authentication portion 250, the key generated by the key generation portion 254 is transmitted to the wireless communication device 50.

(4) DMP Functions

Next, the functions of the DMP 30 according to the present embodiment will be explained with reference to FIG. 5 and FIG. 6.

Figure 5:
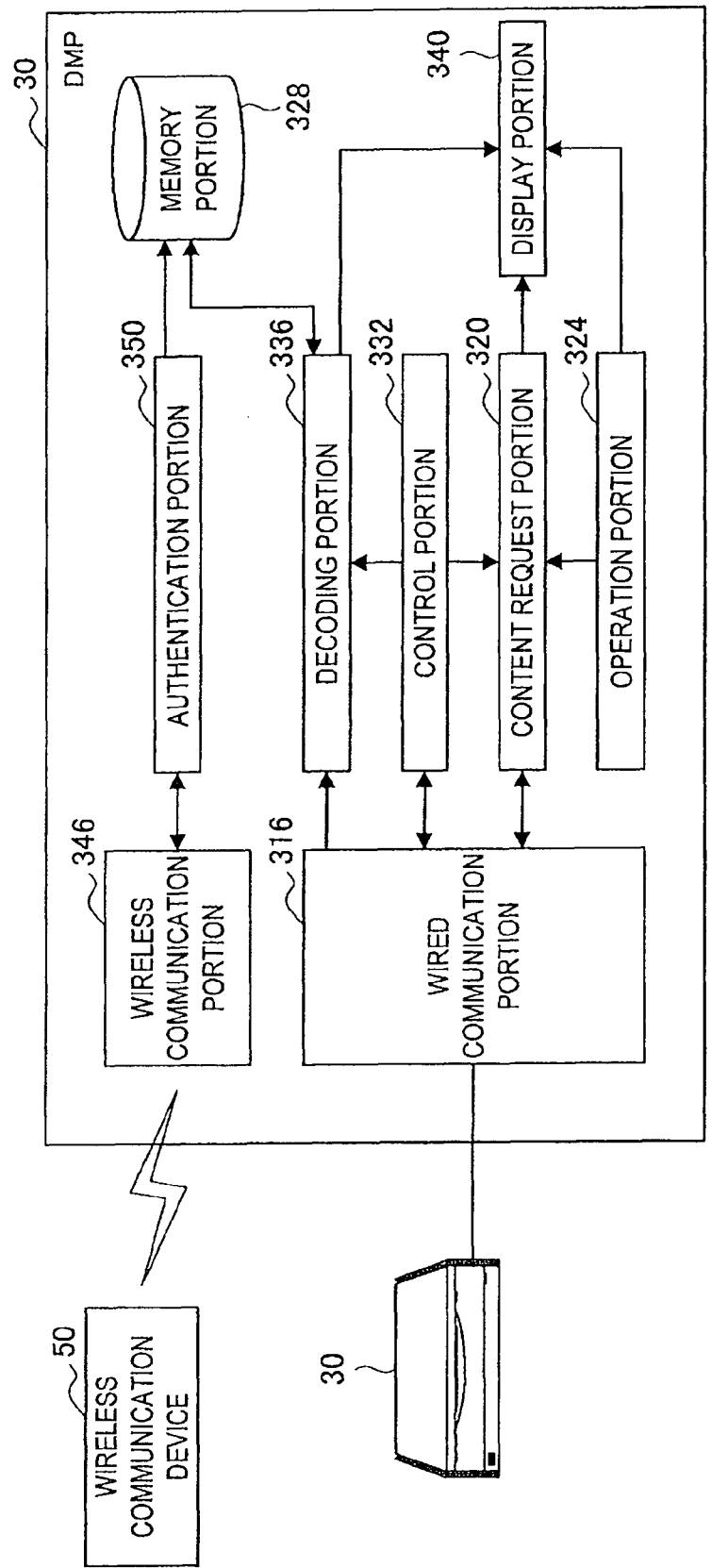
FIG. 5 is a functional block diagram showing a configuration of the DMP according to the present embodiment.

FIG. 5 is a functional block diagram that shows a configuration of the DMP 30 according to the present embodiment. As shown in FIG. 5, the DMP 30 according to the present embodiment includes a wired communication portion 316, a content request portion 320, an operation portion 324, a memory portion 328, a control portion 332, an encryption portion 336, a decoding portion 336, a display portion 340, a wireless communication portion 346, and an authentication portion 350.

The wired communication portion 316 is an interface with the DMS 20, and functions as a third communication portion that receives encrypted content data etc. from the DMS 20. For example, the wired communication portion 316, in the same way as the wired communication portion 216 of the DMS 20, may have communication functions that are compatible with IEEE802.3 compliant wired LAN, communication functions that are HDMI-compatible or IP communication functions that operate via the Ethernet (registered trademark).

The content request portion 320 requests the DMS 20 to transmit a content list and content data based on operation of the operation portion 324 by the user. For example, when the content request portion 320 requests a content list, the content list is transmitted from the DMS 20 and the display portion 340 generates and displays a content list screen 40 shown in FIG. 6.

Figure 6:
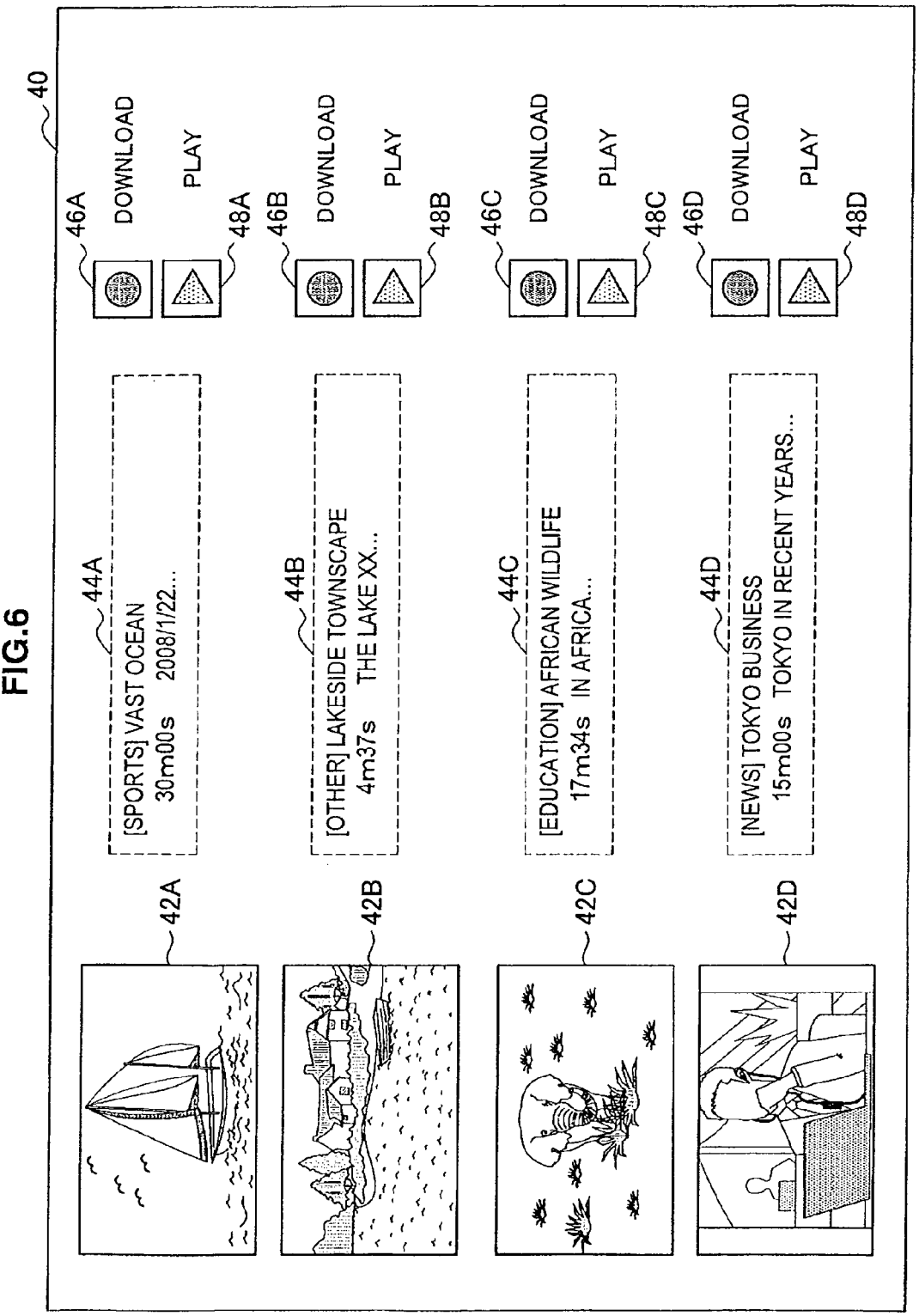
FIG. 6 is an explanatory diagram showing an example of a content list screen.

FIG. 6 is an explanatory diagram that shows an example of the content list screen 40. As shown in FIG. 6, the content list screen 40 includes thumbnails 42A to 42D that correspond to each content data, outline information 44A to 44D, download buttons 46A to 46D and playback buttons 48A to 48D.

On the content list screen 40 shown in FIG. 6, if the download button 46B for the content data with a title name "Lakeside Townscape" is selected by the user, the content request portion 320 requests the DMS 20 to download the content data "Lakeside Townscape."

Further, on the content list screen 40, if the playback button 48B for the content data "Lakeside Townscape" is selected by the user, the content request portion 320 requests the DMS 20 to transmit the streaming data for the content data "Lakeside Townscape."

When the content data transmission is requested in this way by the content request portion 320, the DMS 20 encrypts and then transmits the content data. The decoding portion 336 decodes the content data received by the wired communication portion 316 using the encryption key recorded in the memory portion 328. The content data decoded by the decoding portion 336 is displayed on the display portion 340. Note that the encryption key used to encode the content data on the DMS 20 and the encryption key used to decode the content data on the DMP 30 may be symmetric or asymmetric.

Also, in the same way as the memory portion 228 of the DMS 20, the memory portion 328 may be, for example, a non-volatile memory such as an EEPROM, EPROM or the like, a magnetic disk such as a hard disk, a magnetic material disc, or the like, an optical disk such as a CD-R, a CD-RW, a DVD-R, a DVD-RW, a DVD+R, a DVD+RW, a DVD-RAM, a Blu-ray™ disc recordable (BD-R), a Blu-ray™ disc rewritable (BD-RE), or the like, or an MO disk.

The wireless communication portion 346 is an interface with the wireless communication device 50 and functions as a fourth communication portion that performs communication using the second communication method. In the same way as the wireless communication portion 246 of the DMS 20, the wireless communication portion 346 may have, for example, wireless communication functions that comply with IEEE802.11a, b and g etc. standards, or may have MIMO compliant communication functions as prescribed by the IEEE802.11n standards.

The authentication portion 350 performs an authentication process with the wireless communication device 50 via the wireless communication portion 346. Further, when the authentication process with the wireless communication device 50 is complete, the authentication portion 350 receives the encryption key transmitted from the wireless communication device 50 and records it in the memory portion 328.

(5) Wireless Communication Device Functions

Next, the wireless communication device 50 according to the present embodiment will be explained with reference to FIG. 7.

Figure 7:
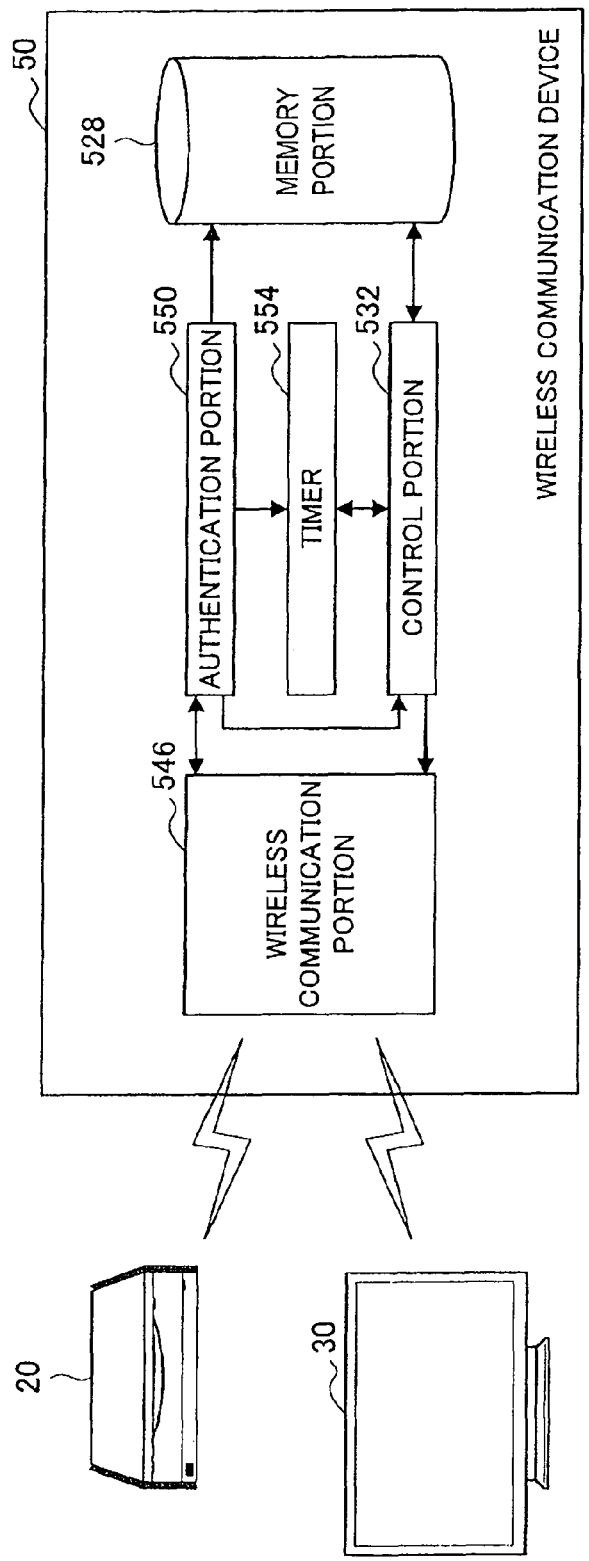
FIG. 7 is a functional block diagram showing a configuration of a wireless communication device according to the present embodiment.

FIG. 7 is a functional block diagram that shows a configuration of the wireless communication device 50 according to the present embodiment. As shown in FIG. 7, the wireless communication device 50 according to the present embodiment includes a memory portion 528, a control portion 532, a wireless communication portion 546, an authentication portion 550, and a timer 554. The wireless communication device 50 is a communication device that, after acquiring the encryption key from the DMS 20, is moved into the vicinity of the DMP 30 and transmits the encryption key to the DMP 30.

The wireless communication portion 546 is an interface with the wireless communication portion 246 of the DMS 20 and the wireless communication portion 346 of the DMP 30, and functions as a fifth communication portion that performs communication using the second communication method. In the same way as the wireless communication portion 246 of the DMS 20, the wireless communication portion 546 may have, for example, wireless communication functions that comply with IEEE802.11a, b and g etc. standards, or may have MIMO compliant communication functions as prescribed by the IEEE802.11n standards.

The authentication portion 550 performs an authentication process with the DMS 20 and an authentication process with the DMP 30. When the authentication process with the DMS 20 is complete, the encryption key is transmitted from the DMS 20. The authentication portion 550 records the transmitted encryption key in the memory portion 528. Note that, in the same way as the memory portion 228 of the DMS 20, the memory portion 528 may be, for example, a non-volatile memory such as an EEPROM, EPROM or the like, a magnetic disk such as a hard disk, a magnetic material disc or the like, an optical disk such as a CD-R, a CD-RW, a DVD-R, a DVD-RW, a DVD+R, a DVD+RW, a DVD-RAM, a Blu-ray™ disc recordable (BD-R), a Blu-ray™ disc rewritable (BD-RE), or the like, or an MO disk.

Further, when the encryption key is recorded in the memory portion 528, the timer 554 starts a clock. For example, the timer 554 may perform a countdown from a predetermined default value (for example, 30 seconds or 5 minutes etc.), or may count up from 0 (zero). Note that, precisely speaking, the trigger for the timer 554 to start the clock may be the reception of the encryption key.

The control portion 532 controls transmission of the encryption key recorded in the memory portion 528 to the DMP 30. The control portion 532 may, for example, transmit the encryption key to the DMP 30 when both the authentication process with the DMP 30 by the authentication portion 550 is complete and the timer 554 has not reached a time out. With this configuration, as the period of time is restricted in which it is possible to transmit the encryption key to the DMP 30 from the point in time at which the wireless communication device 50 acquires the encryption key from the DMS 20, the distance of movement of the wireless communication device 50 is restricted. As a result, it is possible to substantially restrict the distance between the DMS 20 and the DMP 30 that is able to share the encryption key with the DMS 20. Note that this type of the wireless communication device 50 may be a communication device that can be easily moved by the user, such as a mobile telephone, an IC card, a remote control and the like.

(6) Operations of Content Transmission System According to the Present Embodiment Next, a flow of a content transmission method performed using the content transmission system 1 according to the present embodiment will be explained with reference to FIG. 8.

Figure 8:
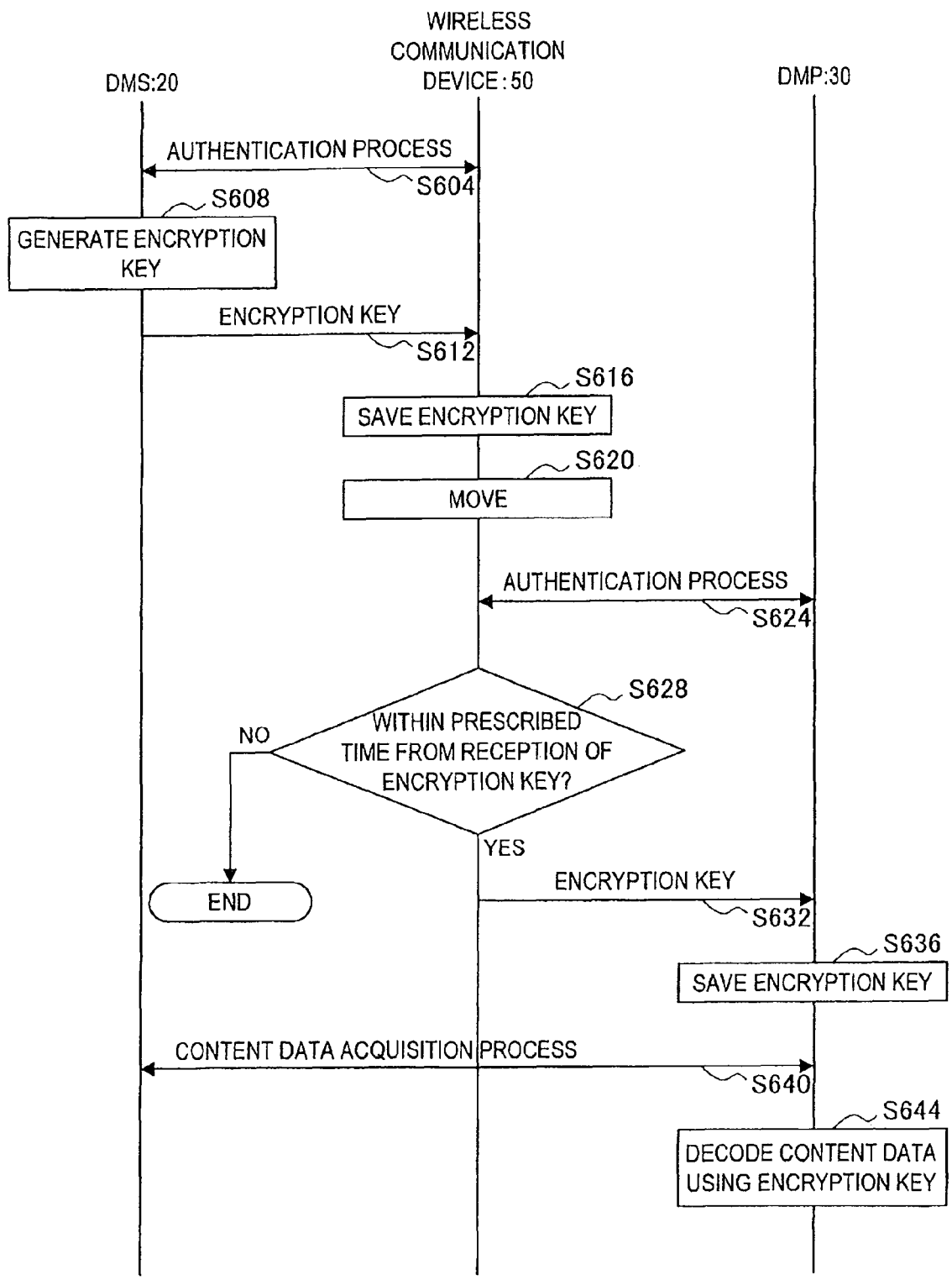
FIG. 8 is a sequence diagram showing a flow of a content transmission method performed in the content transmission system according to the present embodiment.

FIG. 8 is a sequence diagram that shows the flow of the content transmission method performed using the content transmission system 1 according to the present embodiment. As shown in FIG. 8, first, the authentication portion 250 of the DMS 20 and the authentication portion 550 of the wireless communication device 50 perform an authentication process (step S604). Then, if the authentication process is completed normally, the key generation portion 254 of the DMS 20 generates the encryption key (step S608). After that, the encryption key generated by the key generation portion 254 of the DMS 20 is transmitted from the DMS 20 via the wireless communication portion 246, and the wireless communication portion 246 of the wireless communication device 50 receives the encryption key (step S612).

Then, the encryption key received from the DMS 20 is recorded in the memory portion 528 of the wireless communication device 50 (step S616). After that, the wireless communication device 50 is moved by the user to within a range in which wireless communication is possible with the DMP 30 (step S620), and the authentication portion 550 of the wireless communication device 50 and the authentication portion 350 of the DMP 30 perform the authentication process (step S624).

When both the authentication process is complete and the timer 554 has not reached a time out (step S628), the control portion 532 of the wireless communication device 50 transmits the encryption key read from the memory portion 528 from the wireless communication portion 546 to the DMP 30 (step S632). The DMP 30 then records the encryption key received from the wireless communication device 50 in the memory portion 328, and performs a content data acquisition process with the DMS 20 (step S640). The content data acquisition process corresponds, for example, to the process shown in step S42 to step S56 in FIG. 2.

In the above-described content data acquisition process, the content data encrypted using the encryption key is transmitted from the DMS 20 to the DMP 30. The DMP 30 decodes the received content data using the encryption key recorded in the memory portion 328 at step S636 (step S644). As a result, the content data recorded in the DMS 20 can be played back on the DMP 30.

(7) Modified Example

Above, the content transmission system 1 according to the present embodiment is explained with reference to FIG. 3 to FIG. 8. In the example in the above explanation, the DMS 20 generates the encryption key, but the present embodiment is not limited to this example. For example, the encryption key may be generated by a wireless communication device 51 according to a modified example shown in FIG. 9.

Figure 9:
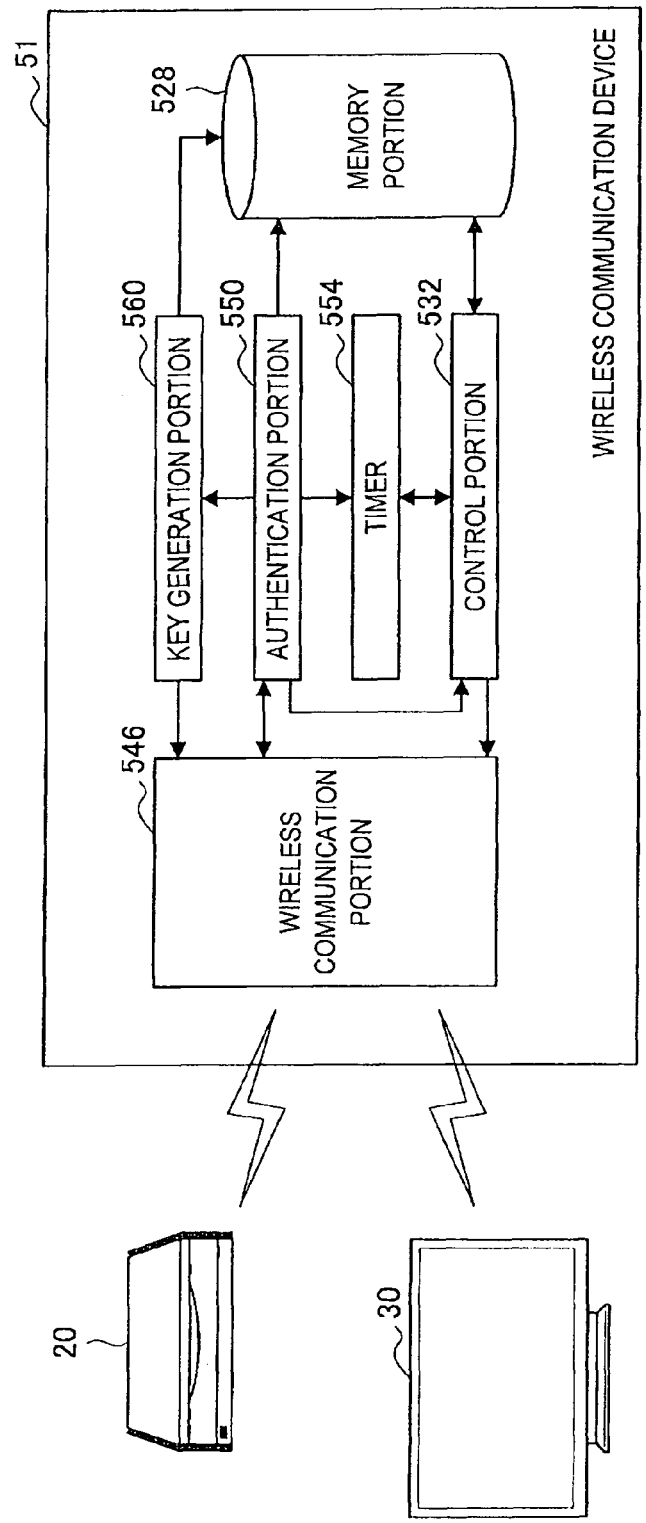
FIG. 9 is a functional block diagram showing a configuration of a wireless communication device according to a modified example.

FIG. 9 is a functional block diagram that shows a configuration of the wireless communication device 51 according to the modified example. As shown in FIG. 9, the wireless communication device 51 according to the modified example further includes a key generation portion 560, in addition to the memory portion 528, the control portion 532, the wireless communication portion 546, the authentication portion 550, and the timer 554.

The key generation portion 560 generates, for example, random numbers as an encryption key, and records the key in the memory portion 528. The encryption key recorded in the memory portion 528 is transmitted to one of the DMS 20 and the DMP 30, after an authentication process by the authentication portion 550 with one of the DMS 20 and the DMP 30.

Then the timer 554 starts a clock, which is triggered by the transmission of the encryption key to one of the DMS 20 and the DMP 30, or by the encryption key being recorded in the memory portion 528, or the like. At the point in time at which the authentication process by the authentication portion 550 with the other one of either the DMS 20 and the DMP 30 is complete, if the timer 554 has not reached a time out, the control portion 532 transmits the encryption key recorded in the memory portion 528 to the other one of either the DMS 20 or the DMP 30. In this way, the wireless communication device 51 according to the modified example generates the encryption key and the wireless communication device 51 can transmit the encryption key to the DMS 20 and the DMP 30.

(8) Conclusion

As explained above, in the present embodiment, even if the distance between the DMS 20 and the DMP 30 is outside the range of communication for the wireless communication method, the DMS 20 and the DMP 30 can share the encryption key through the medium of the wireless communication device 50. As a consequence, the user does not have to move the DMS 20 and the DMP 30 into close proximity to each other, and by causing the symmetric or asymmetric encryption key to be shared by the DMS 20 and the DMP 30, it is possible to share the content data between the DMS 20 and the DMP 30. Moreover, the content data distribution range can be more accurately restricted in comparison with known art.

Further, in the present embodiment, the wireless communication device 50 determines whether or not it is possible to transmit the encryption key by referring to the timer 554. With this configuration, the period of time is restricted within which the wireless communication device 50 can transmit the encryption key to the DMP 30 from the point in time at which it acquires the encryption key from the DMS 20, and the movement distance of the wireless communication device 50 is thus also restricted. As a result, it is possible to substantially restrict the distance between the DMS 20 and the DMP 30 that is able to share the encryption key with the DMS 20.

It should be understood by those skilled in the art that various modifications, combinations, sub-combinations and alterations may occur depending on design requirements and other factors insofar as they are within the scope of the appended claims or the equivalents thereof.

The example in the above-described embodiment explains a case in which the DMS 20 generates the encryption key and the DMP 30 acquires the encryption key generated by the DMS 20 via the wireless communication device 50. However, the present invention is not limited to this example. For example, the DMP 30 may generate the encryption key and the DMS 20 may acquire the encryption key generated by the DMP 30 via the wireless communication device 50.

It is not necessary to process each of the steps in the processing performed by the content transmission system 1 of the present specification chronologically and in accordance with the order noted on the sequence diagrams. For example, each of the steps in the processing performed by the content transmission system 1 may include processing that is performed in parallel or separately (for example, parallel processing or object processing). Further, in the explanation of the example here, the DMS 20 generates the encryption key after the authentic process shown in FIG. 8, but the DMS 20 may generate the encryption key before the authentication process.

Further, a computer program can be provided that causes the hardware that is built into the DMS 20, the DMP 30 and the wireless communication device 50, such as the CPU 201, the ROM 202 and the RAM 203, to fulfill similar functions of each of the components of the DMS 20, the DMP 30 and the wireless communication device 50. A storage medium on which the computer program is stored may also be provided. Further, each of the function blocks shown in the functional block diagrams in FIG. 4, FIG. 5 and FIG. 7 can be formed by hardware and realized by the hardware as a series of processes.

What is claimed is:

1. A content transmission system comprising:
   a content transmission device that includes
   an encryption portion that encrypts content data using key information which is representative of an encryption key,
   a first communication portion that transmits, using a first communication method, content data encrypted by the encryption portion, and
   a second communication portion that performs communication using a second communication method that differs from the first communication method;
   a content reception device that includes
   a third communication portion that receives encrypted content data transmitted from the first communication portion using the first communication method,
   a decoding portion that decodes encrypted content data received by the third communication portion using key information that is symmetric or asymmetric to the key information, and
   a fourth communication portion that performs communication using the second communication method; and
   a communication device that acquires the key information and transmits the acquired key information using the second communication method,
   in which the first communication method is a wired communication such that the first communication portion and the third communication portion are connected together by a wire to enable the wired communication therebetween, and in which the second communication method is a wireless communication such that the second communication portion and the fourth communication portion communicate therebetween only in a wireless manner,
   in which the communication device includes a timer, and
   in which the communication device only transmits the acquired key information when (i) an authentication process between the communication device and at least one of the content transmission device and the content reception device is successfully completed, and (ii) a period of time from when the communication device acquires the key information representative of the encryption key to a current time as measured by the timer has not exceeded a predetermined time value.

2. The content transmission system according to claim 1, wherein
   the communication device further includes
   a key generation portion that acquires the key information by generating the key information, and
   the communication device transmits the key information generated by the key generation portion.

3. The content transmission system according to claim 1, wherein the communication device further includes
a fifth communication portion that receives the key information using the second communication method from one of the content transmission device and the content reception device, and
a memory portion that records the key information received by the fifth communication portion, and wherein
the fifth communication portion transmits the key information recorded in the memory portion to the other one of the content transmission device and the content reception device, using the second communication method.

4. A communication device comprising:
a fifth communication portion that is capable of communicating with a content transmission device and a content reception device using a second communication method, wherein the content transmission device includes
an encryption portion that encrypts content data using key information which is representative of an encryption key,
a first communication portion that transmits, using a first communication method, content data encrypted by the encryption portion, and
a second communication portion that performs communication using the second communication method that differs from the first communication method, and
the content reception device includes
a third communication portion that receives encrypted content data transmitted from the first communication portion using the first communication method,
a decoding portion that decodes encrypted content data received by the third communication portion using key information that is symmetric or asymmetric to the key information, and
a fourth communication portion that performs communication using the second communication method; and
a key generation portion that generates the key information; and
a timer,
in which the first communication method is a wired communication such that the first communication portion and the third communication portion are connected together by a wire to enable the wired communication therebetween, and in which the second communication method is a wireless communication such that the second communication portion and the fourth communication portion communicate therebetween only in a wireless manner,
wherein the fifth communication portion transmits the key information generated by the key generation portion to the second communication portion and the fourth communication portion, and
wherein the fifth communication portion only transmits the acquired key information when (i) an authentication process between the communication device and the content transmission device and between the communication device and the content reception device are successfully completed, and (ii) a period of time from when the communication device acquires the key information representative of the encryption key to a current time as measured by the timer has not exceeded a predetermined time value.

5. A content transmission method comprising the steps of:
transmitting, by a content transmission device that is compliant with a first transmission method and a second transmission method that differs from the first transmission method, encrypted content data using the first transmission method, the content data being encrypted by the content transmission device using key information which is representative of an encryption key;
receiving and decoding, by a content reception device that is compliant with the first communication method and the second communication method, encrypted content data, the content data being decoded using key information that is symmetric or asymmetric to the key information; wherein
before the step of transmitting,
a communication device acquires the key information and transmits the acquired key information, using the second communication method, to at least one of the content transmission device and the content reception device,
in which the first communication method is a wired communication such that the first communication portion and the third communication portion are connected together by a wire to enable the wired communication therebetween, and in which the second communication method is a wireless communication such that the second communication portion and the fourth communication portion communicate therebetween only in a wireless manner,
in which the communication device includes a timer, and
in which the communication device only transmits the acquired key information when (i) an authentication process between the communication device and at least one of the content transmission device and the content reception device is successfully completed, and (ii) a period of time from when the communication device acquires the key information representative of the encryption key to a current time as measured by the timer has not exceeded a predetermined time value.

6. The content transmission system according to claim 1, in which the communication device further includes a memory for storing the key information.

7. The content transmission system according to claim 1, in which the authentication process includes a first authentication process between the communication device and the content transmission device and a second authentication process between the communication device and the content reception device, and in which the communication device only transmits the acquired key information to the content reception device when (i) both the first authentication process and the second authentication process are successfully completed, and (ii) the measured period of time has not exceeded the predetermined time value.

8. The content transmission system according to claim 7, in which the content transmission device includes a key information generator to generate the key information, and in which the first authentication process is performed before the key information is generated and the second authentication process is performed after the key information is generated.

9. The content transmission method according to claim 5, in which the authentication process includes a first authentication process between the communication device and the content transmission device and a second authentication process between the communication device and the content reception device, and in which the communication device only transmits the acquired key information to the content reception device when (i) both the first authentication process and the second authentication process are successfully completed, and (ii) the measured period of time has not exceeded the predetermined time value.

* * * * *